United States Patent
Wang et al.

(10) Patent No.: US 10,900,510 B2
(45) Date of Patent: Jan. 26, 2021

(54) ARTIFICAL ALUMINUM LAYERS FOR FASTENING MAGNESIUM CASTINGS

(71) Applicant: Magnesium Products of America Inc., Eaton Rapids, MI (US)

(72) Inventors: Gerry Gang Wang, London (CA); Jonathan Patrick Weiler, London (CA)

(73) Assignee: MAGNESIUM PRODUCTS OF AMERICA INC., Eaton Rapids, MI (US)

(*) Notice: Subject to any disclaimer, the term of this patent is extended or adjusted under 35 U.S.C. 154(b) by 216 days.

(21) Appl. No.: 16/116,513

(22) Filed: Aug. 29, 2018

(65) Prior Publication Data
US 2020/0072265 A1  Mar. 5, 2020

(51) Int. Cl.
| | | |
|---|---|---|
| F16B 5/04 | (2006.01) | |
| F16B 19/10 | (2006.01) | |
| B21J 15/02 | (2006.01) | |
| F16B 19/08 | (2006.01) | |
| F16B 5/00 | (2006.01) | |
| B32B 7/12 | (2006.01) | |
| C22C 21/08 | (2006.01) | |
| C22C 38/02 | (2006.01) | |
| C22C 38/04 | (2006.01) | |
| B32B 15/01 | (2006.01) | |
| C22C 23/02 | (2006.01) | |

(52) U.S. Cl.
CPC ............... *F16B 5/04* (2013.01); *B21J 15/025* (2013.01); *F16B 5/0096* (2013.01); *F16B 19/086* (2013.01); *F16B 19/1027* (2013.01); *B32B 7/12* (2013.01); *B32B 15/017* (2013.01); *C22C 21/08* (2013.01); *C22C 23/02* (2013.01); *C22C 38/02* (2013.01); *C22C 38/04* (2013.01)

(58) Field of Classification Search
None
See application file for complete search history.

(56) References Cited

U.S. PATENT DOCUMENTS

| | | | |
|---|---|---|---|
| 2010/0083481 A1 | 4/2010 | Luo et al. | |
| 2012/0168200 A1 | 7/2012 | Iwai et al. | |
| 2013/0336745 A1 | 12/2013 | Trinick et al. | |
| 2015/0183022 A1* | 7/2015 | Trinick | B21J 15/36 29/524.1 |
| 2015/0362004 A1* | 12/2015 | Campbell | F16B 19/086 411/502 |
| 2016/0245323 A1* | 8/2016 | Freis | F16B 5/04 |

OTHER PUBLICATIONS

International Search Report and Written Opinion regarding Application No. PCT/US2019/048633; 13 pages.

* cited by examiner

*Primary Examiner* — Daniel J. Schleis
(74) *Attorney, Agent, or Firm* — Foley & Lardner LLP

(57) ABSTRACT

A self-piercing rivet (SPR) joint includes a top layer including at least one steel material or at least one aluminum material, a middle layer including at least one magnesium material, and a bottom artificial aluminum layer including at least one aluminum material.

17 Claims, 3 Drawing Sheets

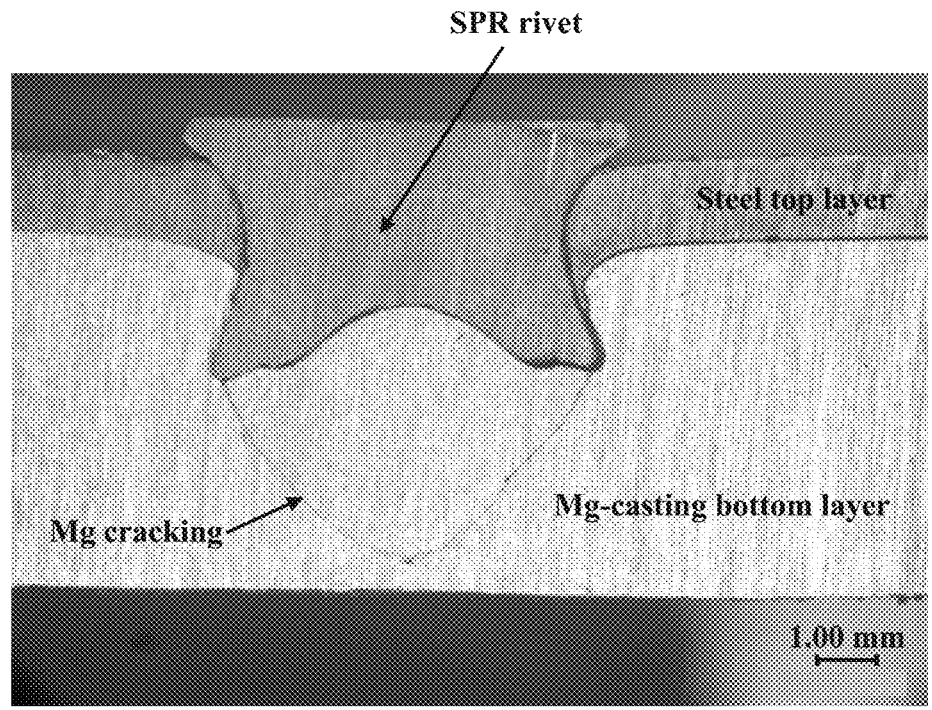
FIG. 1
FIG. 2
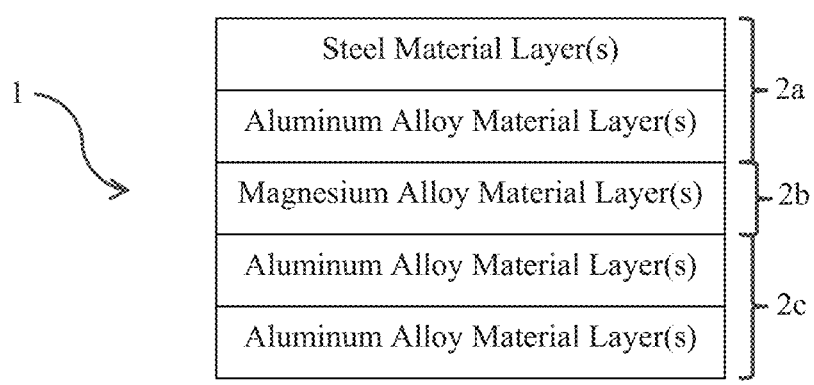

|  | Conventional SPR joint | Improved SPR joint |
|---|---|---|
| Top Layer | 1.27mm CR3 steel | 1. 0.8mm CR3 steel<br>2. 1.0 DP600 steel<br>3. 2.1mm 6061-T6 Alum.<br>4. 2.5mm 6061-T6 Alum. |
| Middle Layer |  | 2.0mm AM60B Magnesium |
| Bottom Layer | 4.0mm AM50A Magnesium | 3.0mm Al3Mg Aluminum<br>3.0mm 5052 Aluminum |
| Rivet | C5.3x5 H4 | 1 and 2. C5.3X8 H6<br>3 and 4. CSK5.3x10 H4 |
| Die | Special designed shallow die to minimize cracking | Conventional SPR die |
| Issues | Cracking in Mg | No Cracking detected |

FIG. 5

ARTIFICAL ALUMINUM LAYERS FOR FASTENING MAGNESIUM CASTINGS

BACKGROUND

The present application relates to artificial aluminum layers. More specifically, the present application relates to artificial aluminum layers for fastening magnesium castings in self-pierce riveting (SPR) applications.

Self-pierce riveting (SPR) is a high-speed mechanical fastening process for joining two or more sheets of material without a predrilled or punched hole. Typically, SPR processes are conducted by driving a semi-tubular rivet through top layers of material and upsetting the rivet in a lower layer (without completely piercing the lower layer) to form a durable mechanical joint. Attempts have been made to use existing SPR technologies to fasten an aluminum alloy top layer or a steel top layer to a cast magnesium alloy bottom layer. This rivet structure has suffered from limited integrity due to cracking of the magnesium alloy casting. The cracking of the magnesium alloy casting is related to the low formability of magnesium and its alloys. In addition, when magnesium casting is pre-coated (e.g., using electrophoretic coating or with a powder coat), the coating is damaged when forming the buttons on the die. Thus, while lightweight magnesium alloy die castings offer the potential for weight reduction in automotive technologies, mechanical properties of magnesium alloys limit its use in SPR processes.

It would be advantageous to provide an improved artificial aluminum layer for fastening magnesium castings in self-piercing rivet (SPR) applications that overcomes the foregoing challenges. These and other advantageous features will be apparent to those reviewing the present disclosure.

SUMMARY

An exemplary embodiment relates to a self-piercing rivet (SPR) joint includes a top layer including at least one steel material or at least one aluminum material, a middle layer including at least one magnesium material, and a bottom artificial aluminum layer including at least one aluminum material.

BRIEF DESCRIPTION OF THE DRAWINGS

FIG. 1 is a cross-sectional view of a conventional SPR joint with panels showing cracking in the magnesium material as the bottom layer.

FIG. 2 is a schematic showing the relative positioning of the layers of one exemplary embodiment of a SPR joint.

FIG. 5 illustrates structural differences between a conventional SPR joint of FIG. 1 and an improved SPR joint of the present disclosure.

DETAILED DESCRIPTION

Figure 3A:
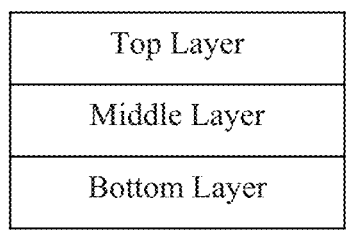
FIGS. 3A-3D is a schematic showing the relative positioning of the top layer, middle layer, and bottom layer according to different exemplary embodiments of a SPR joint.

The present disclosure describes artificial aluminum layers for fastening magnesium castings in self-piercing rivet (SPR) applications. FIG. 1 is a cross-sectional view of a conventional SPR joint suffering from structural defects to the cast magnesium alloy layer located immediately beneath a steel top layer. Specifically, severe cracks may occur at the joint buttons of the magnesium layer. The present disclosure describes an improved artificial aluminum layer for fastening magnesium castings in SPR applications that overcomes the foregoing challenges.

In one exemplary embodiment as illustrated schematically in FIG. 2, an improved SPR joint 1 includes a top layer 2a including at least one steel material layer and at least one aluminum material layer, a middle layer 2b including at least one magnesium material layer, and a bottom artificial aluminum layer 2c including at least two different aluminum material layers. In a particular exemplary embodiment, the top layer includes at least two different layers of steel and at least two different layers of aluminum-based material.

In one embodiment, the at least two different layers of steel of the top layer includes a first layer of steel of a first steel material and a second layer of steel of a second steel material, the first steel material and the second steel material being different from each other.

The steel layer(s) may have a variety of different compositions. For example, in one embodiment, the steel may be a low carbon steel having iron alloyed with about 0.25 wt. % carbon. In another embodiment, the steel may be a high carbon steel having iron alloyed with up to about 2.5 wt. % carbon. In other embodiments, the steel may be a stainless steel having iron alloyed with chromium and nickel. According to other embodiments, any steel may be used comprising at least one of iron, carbon, manganese, chromium, nickel, tungsten, molybdenum, boron, titanium, vanadium, cobalt, niobium, or a combination thereof. For example, the steel layer may comprise CR3 steel, which includes about 0.10% carbon (C), about 0.45% manganese (Mn), at most 0.03% sulfur (S), at most 0.04% phosphorus (P), balance iron (Fe), and trace impurities and/or ferrite-martensite dual phase (DP) 600 steel, which includes about 0.10% carbon (C), about 1.4% manganese (Mn), about 0.14% silicon (Si), balance iron (Fe), and trace impurities.

According to an exemplary embodiment, the top layer includes at least two different layers of steel, at least one of which is a high-strength steel, for example, a high-strength steel comprising at least one of weathering steel, control-rolled steels, pearlite-reduced steels, acicular ferrite steels, dual-phase steels, or microalloyed steels. Weathering steels (i.e. ASTM A242, ASTM A588) exhibit increased resistance to atmospheric corrosion due by forming a corrosion-retarding protective layer on its surface under the influence of external conditions. Control-rolled steels (i.e. hot-rolled steels), which have a highly deformed austenite structure that transforms to a fine equiaxed ferrite structure upon cooling, exhibit improved toughness and strength, ductility, resistance to vibration and shock, formability, and weldability. Pearlite-reduced steels, which have low carbon content and little or no pearlite, have a very fine grain ferrite matrix and are strengthened by precipitation hardening. Acicular ferrite steels are characterized by having a very fine, high strength acicular ferrite structure, a very low carbon content, and good hardenability. Dual-phase steel (i.e. FF 280 DP, DP450, DP500, DP600, DP780 (and derivatives), DP980 (and derivatives), DP1180) is a high-strength steel having a ferritic microstructure and small, uniformly distributed sections of martensite. Typically, this microstructure gives the steels a low yield strength, high rate of work hardening, and good formability. Microalloyed steels, which contain very small additions of niobium, vanadium, and/or titanium, have a refined grain size and/or precipitation hardening.

The at least two different layers of aluminum of the top layer include a first layer of aluminum of a first aluminum material and a second layer of aluminum of a second aluminum material.

In one embodiment, at least one layer of aluminum may be a 1000 series aluminum alloy, a 2000 series aluminum alloy, a 3000 series aluminum alloy, a 4000 series aluminum alloy, a 5000 series aluminum alloy, a 6000 series aluminum alloy, a 7000 series aluminum alloy, or an 8000 series aluminum alloy.

The 1000 series aluminum alloy (i.e. 1050, 1060, 1070, 1100, 1145, 1199, 1350, etc.) is essentially pure aluminum with a minimum 99 wt. % aluminum content and may be work hardened. The 2000 series aluminum alloy (i.e. 2011, 2014, 2024, 2036, 2048, 2090, 2091, 2099, 2124, 2195, 2218, 2219, 2319, 2618, etc.) is alloyed with copper and may be precipitation hardened to strengths comparable to steel. The 3000 series aluminum alloy (i.e. 3003, 3004, 3005, 3102, 3103, 3105, 3303, etc.) is alloyed with manganese and may be work hardened. The 4000 series aluminum alloy (i.e. 4006, 4007, 4015, 4032, 4043, etc.) is alloyed with silicon. The 5000 series aluminum alloy (i.e. 5005, 5010, 5019, 5026, 5050, 5052, 5056, 5059, 5083, 5086, 5154, 5182, 5252, 5254, 5356, 5454, 5456, 5457, 5652, 5657, 5754, Al3Mg, etc.) is alloyed with magnesium and offer enhanced corrosion resistance. The 6000 series aluminum alloy (i.e. 6005, 6009, 6010, 6060, 6061, 6063, 6063A, 6065, 6066, 6070, 6081, 6082, 6101, 6105, 6151, 6162, 6201, 6205, 6262, 6351, 6463, etc.) is alloyed with magnesium and silicon and is machinable, weldable, and may be precipitation hardened. The 7000 series aluminum alloy (i.e. 7005, 7039, 7049, 7050, 7068, 7072, 7075, 7079, 7116, 7129, 7175, 7178, 7475, etc.) is alloyed with zinc and may be precipitation hardened to the highest strengths of any aluminum alloy, with a tensile strength up to 700 MPa. The 8000 series aluminum alloy (i.e. 8011, 8090, etc.) is alloyed with elements which are not covered by 1000-7000 series aluminum alloys.

In one embodiment, the first aluminum material of the top layer and the second aluminum material of the top layer are 6000 series aluminum alloys. In one embodiment, the bottom artificial aluminum layer comprises at least two different layers of aluminum alloy. In one embodiment, the at least two different layers of aluminum alloy of the bottom layer include at least one layer of 5000 series aluminum alloy. According to an exemplary embodiment, the bottom artificial aluminum layer may comprise 5052 aluminum, which includes about 2.2-2.8% magnesium (Mg), at most about 0.15-0.35% chromium (Cr), at most 0.1% copper (Cu), at most 0.4% iron (Fe), at most 0.1% manganese (Mn), at most 0.25% silicon (Si), at most 0.1% zinc (Zn), balance aluminum (Al), and trace amount of other impurities and/or Al3Mg aluminum, which includes.

The middle layer includes at least one magnesium layer, such as a magnesium alloy. In one embodiment, the at least one layer of magnesium alloy may be AE42, AE44, AM20, AM40, AM50, AM60, AM60B, AS21, AS41, AZ31, AZ61, AZ63, AZ80, AZ81, AZ91, Elektron 21, Elektron 675, EZ33, HK31, HM21, HZ32, K1A, LA141, LA103, LAZ43, M1, M1A, QE22, QH21, WE43, WE54, ZC63, ZC71, ZE41, ZK10, ZK20, ZK30, ZK40, ZK51, ZK60, ZK61, ZM21, ZMC711, any alloys with magnesium contents of 80% of higher, or a combination thereof. According to an exemplary embodiment, the magnesium layer may comprise AM60B magnesium alloy, which includes about 5.5-6.5% aluminum (Al), about 0.24-0.6% manganese (Mn), at most about 0.22% zinc (Zn), at most about 0.1% silicon (Si), at most about 0.01% copper (Cu), at most about 0.005% iron (Fe), at most about 0.002% nickel (Ni), balance magnesium (Mg), and trace impurities.

Figure 3B:
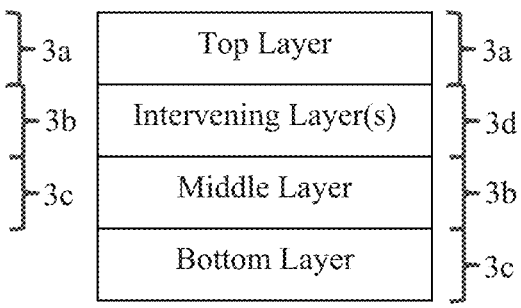
Figure 3C:
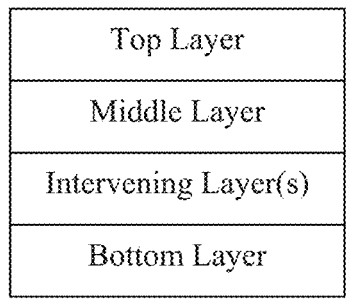
Figure 3D:
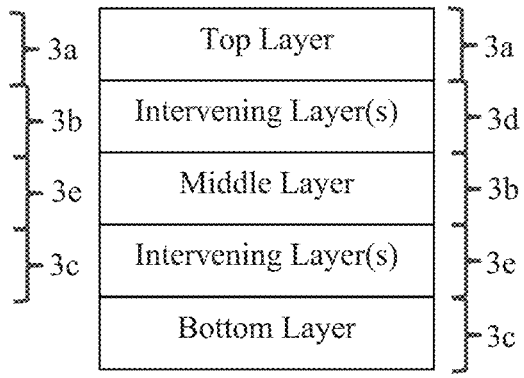

FIGS. 3A-3D is a schematic showing the relative positioning of the top layer, middle layer, and bottom layer according to different exemplary embodiments of a SPR joint. The top layer 3a is either in contact with the middle layer 3b (FIGS. 3A and 3C) or separated from the middle layer 3b by at least one intervening layer 3d (FIGS. 3B and 3D). The middle layer 3b is either in contact with the bottom artificial aluminum layer 3c (FIGS. 3A and 3B) or separated from the bottom artificial aluminum layer 3c by at least one intervening layer 3e (FIGS. 3C and 3D). In one embodiment, the bottom artificial aluminum layer 3c is not bonded to the middle layer 3b. In another embodiment, the bottom artificial aluminum layer 3c is associated with the middle layer 3b via an intervening adhesive layer.

Referring to FIGS. 3A-3D, a thickness of the top layer 3a is in a range of 0.5 mm to 8.0 mm, a thickness of the middle layer 3b is in a range of 1.5 mm to 6.5 mm, and a thickness of the bottom artificial aluminum layer 3c is in a range of 1.5 mm to 7.5 mm. In one embodiment, a combined thickness of the middle layer 3b and the bottom artificial aluminum layer 3c is 40-70% of a total thickness of the SPR joint. In one embodiment, a thickness of the bottom artificial aluminum layer 3c is 20-55% of a total thickness of the SPR joint.

EXAMPLE

Figure 4:
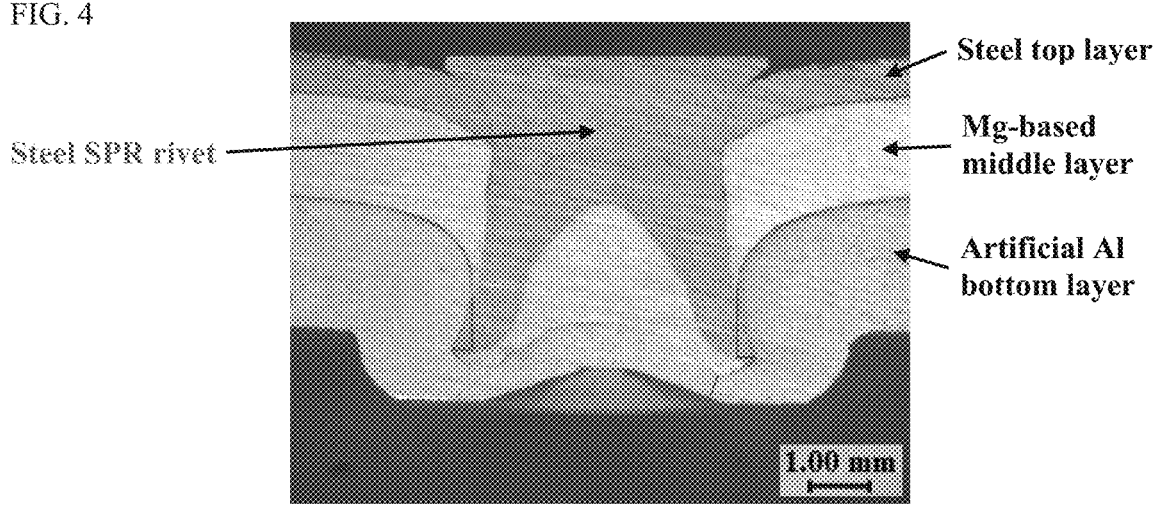
FIG. 4 is a cross-sectional view of a one exemplary embodiment of a SPR joint.

FIG. 4 is a cross-sectional view of a one exemplary embodiment of a SPR joint comprising a top steel layer, magnesium-based middle layer, and artificial aluminum bottom layer. Initially, the top steel layer, magnesium-based middle layer, and artificial aluminum bottom layer are clamped together. Next, the semi-tubular rivet is driven into each of the three layers using a punch and die in a press tool. From FIG. 4, a steel SPR rivet penetrates completely through the top layer and the middle layer, and the die shape causes the rivet to flare within the artificial aluminum bottom layer to form a mechanical interlock in the artificial aluminum bottom layer. The rivet may be set flush with the top layer. The die shape causes a button to form on the underside of the artificial aluminum bottom layer. The steel SPR rivet only partially penetrates through the artificial aluminum bottom layer. In this arrangement, the top layer is joined onto the magnesium-based middle layer without the use of adhesives or other intervening layers. The rivet sheared through the magnesium-based middle layer and forms the button in the artificial aluminum bottom layer. The presence of the artificial aluminum bottom layer, and specifically, an artificial aluminum bottom layer comprising at least two different layers of aluminum alloy, prevents cracks or defects from forming in the magnesium-based middle layer.

In the embodiment of FIG. 4, the top layer includes (1) 0.8 mm of a CR3 steel, (2) 1.0 mm of a DP600 steel, (3) 2.1 mm of a first 6061 series aluminum alloy, and (4) 2.5 mm of a second 6061 series aluminum alloy. The magnesium-based middle layer includes a 2.0 mm AM60B magnesium alloy. The artificial aluminum bottom layer includes a 3.0 mm Al3Mg aluminum alloy and a 3.0 mm 5052 aluminum alloy.

Conventional SPR joints often suffer from structural defects to the bottom magnesium layer due to severe cracks occurring at the joint buttons of the magnesium layer (FIG. 1). Often, these defects are due to the lack of formability of magnesium and its alloys. For example, in FIG. 1, the top layer is a single steel layer and the bottom layer is a single magnesium layer. As a result, when a semi-tubular rivet is driven through the top layer and flares in the magnesium bottom layer, severe plastic deformation results in the magnesium layer.

FIG. 5 illustrates structural differences between a conventional SPR joint of FIG. 1 and an improved SPR joint of the present disclosure. The present disclosure describes a multi-stack structure including a top layer having at least two steel layers and at least two aluminum layers and a bottom layer having at least two different aluminum layers. Additionally, two separate types of rivets are used (i.e. C5.3×8 H6 rivets to pierce the steel top layer and CSK5.3× 10 H4 rivets to pierce the top aluminum layer). Moreover, the thicknesses of the magnesium layer are optimized to improve the ease by which the rivet shears through the magnesium layer. In some embodiments, there is an adhesive layer positioned between the top layer and the magnesium-based middle layer and/or the magnesium-based middle layer and the bottom layer. The assembly may be riveted before or after the adhesive layer is cured.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the SPR joint as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A self-piercing rivet (SPR) joint, comprising:
 a top layer including at least one steel material or at least one aluminum material;
 a middle layer including at least one magnesium material; and
 a bottom artificial aluminum layer including at least one aluminum material, wherein the bottom artificial aluminum layer is not bonded to the middle layer.

2. The SPR joint of claim 1, wherein the top layer is in contact with the middle layer and the middle layer is in contact with the bottom artificial layer.

3. An SPR joint, comprising:
a top layer including at least one steel material or at least one aluminum material;
a middle layer including at least one magnesium material; and
a bottom artificial aluminum layer including at least one aluminum material, wherein the top layer is separated from the middle layer by at least one first intervening adhesive layer and the middle layer is separated from the bottom artificial aluminum layer by at least one second intervening adhesive layer.

4. The SPR joint of claim 1, wherein a combined thickness of the middle layer and the bottom artificial aluminum layer is 40-70% of a total thickness of the SPR joint.

5. The SPR joint of claim 1, wherein a thickness of the bottom artificial aluminum layer is 20-55% of a total thickness of the SPR joint.

6. An SPR joint, comprising:
a top layer including at least one steel material or at least one aluminum material;
a middle layer including at least one magnesium material; and
a bottom artificial aluminum layer including at least one aluminum material, wherein the top layer comprises at least two different layers of steel and at least two different layers of aluminum.

7. The SPR joint of claim 6, wherein the at least two different layers of steel consists of a first layer of steel of a first steel material and a second layer of steel of a second steel material, wherein the first steel material and the second steel material are different.

8. The SPR joint of claim 6, wherein the at least two different layers of steel comprise at least one layer of high-strength steel.

9. The SPR joint of claim 6, wherein the at least two different layers of aluminum consists of a first layer of aluminum of a first aluminum material and a second layer of aluminum of a second aluminum material, wherein the first aluminum material and the second aluminum material are 6000 series aluminum alloys.

10. The SPR joint of claim 1, wherein the middle layer comprises at least one layer of magnesium alloy.

11. The SPR joint of claim 10, wherein the at least one layer of magnesium alloy includes at least one layer of AE42, AE44, AM20, AM40, AM50, AM60, AM60B, AS21, AS41, AZ31, AZ61, AZ63, AZ80, AZ81, AZ91, Elektron 21, Elektron 675, EZ33, HK31, HM21, HZ32, K1A, LA141, LA103, LAZ43, M1, M1A, QE22, QH21, WE43, WE54, ZC63, ZC71, ZE41, ZK10, ZK20, ZK30, ZK40, ZK51, ZK60, ZK61, ZM21, ZMC711, or any alloys with magnesium contents of 80% of higher.

12. The SPR joint of claim 1, wherein the bottom artificial aluminum layer comprises at least two different layers of aluminum alloy.

13. The SPR joint of claim 12, wherein the at least two different layers of aluminum alloy consists of a first layer of aluminum of a first aluminum material and a second layer of aluminum of a second aluminum material, wherein the first aluminum material and the second aluminum material are different.

14. The SPR joint of claim 1, wherein a thickness of the middle layer is in a range of 1.5 mm to 6.5 mm.

15. The SPR joint of claim 1, wherein a thickness of the bottom artificial aluminum layer is in a range of 2.5 mm to 7.5 mm.

16. The SPR joint of claim 1, wherein a thickness of the top layer is in a range of 0.5 mm to 8.0 mm.

17. A self-piercing rivet (SPR) joint, comprising:
a top layer including at least one steel material or at least one aluminum material;
a middle layer including at least one magnesium material; and
a bottom artificial aluminum layer comprising at least two different layers of aluminum alloy, wherein the at least two different layers of aluminum alloy consists of a first layer of aluminum of a first aluminum material and a second layer of aluminum of a second aluminum material, and wherein the first aluminum material and the second aluminum material are different.

* * * * *